United States Patent
Koorn et al.

(10) Patent No.: US 6,250,058 B1
(45) Date of Patent: Jun. 26, 2001

(54) ROTARY HAYRAKING IMPLEMENT FOR UNEVEN TERRAINS

(75) Inventors: Maarten Koorn, Schiedam; Norbert van Hemert, Rotterdam, both of (NL)

(73) Assignee: Maasland N.V. A Dutch Limited Liability Co. (NL)

(*) Notice: Subject to any disclaimer, the term of this patent is extended or adjusted under 35 U.S.C. 154(b) by 0 days.

(21) Appl. No.: 09/328,429

(22) Filed: Jun. 9, 1999

Related U.S. Application Data

(63) Continuation of application No. PCT/NL98/00577, filed on Oct. 7, 1998.

(30) Foreign Application Priority Data

Oct. 9, 1997 (NL) .................................................. 1007236
Aug. 26, 1998 (NL) .................................................. 1009947

(51) Int. Cl.$^7$ ................................................. A01D 79/00
(52) U.S. Cl. ................................................. 56/384; 56/370
(58) Field of Search ..................... 56/384, 365, 370, 56/400, 366, 362, 372, 377

(56) References Cited

U.S. PATENT DOCUMENTS

| | | | |
|---|---|---|---|
| 3,827,224 | * 8/1974 | Mulder et al. | 56/370 |
| 3,832,838 | * 9/1974 | Hale | 56/377 |
| 3,841,073 | * 10/1974 | Van Der Lely et al. | 56/370 |
| 3,946,544 | * 3/1976 | Van Der Lely | 56/370 |
| 3,948,028 | * 4/1976 | Reber | 56/365 |
| 4,020,620 | * 5/1977 | Van Der Lely | 56/370 |
| 4,023,335 | * 5/1977 | Van Der Lely et al. | 56/370 |
| 4,062,173 | * 12/1977 | Mulder | 56/370 |
| 4,062,174 | * 12/1977 | Knuesting | 56/370 |
| 4,157,644 | * 6/1979 | Van Der Lely | 56/370 |
| 4,202,160 | * 5/1980 | Van Der Lely | 56/366 |
| 4,275,551 | * 6/1981 | Van Der Lely | 56/370 |
| 4,275,552 | * 6/1981 | DeCoene | 56/370 |
| 4,330,986 | * 5/1982 | Van Der Lely et al. | 56/377 |

* cited by examiner

Primary Examiner—Thomas B. Will
Assistant Examiner—Arpad Fabian Kovacs
(74) Attorney, Agent, or Firm—Penrose Lucas Albright

(57) ABSTRACT

An implement for displacing crop lying on the ground comprising at least one rake member which is driven so as to be rotatable about an upwardly orientated axis and which is provided with a plurality of outwardly extending arms, each of which pivots in upward direction about a pivot axis. Each arm has a pair of outwardly extending tines connected pivotably thereto. The pivotal connections of the arms to the rake wheels and the tines to the arms of each assemble of arms and tines is such that the center of gravity, when the implement is operating, is so disposed that the resultant of the gravitational and centrifugal forces urge the arms and the tines towards the underlying ground. The rake wheels can be folded upwardly about their pivot axes into a transport position wherein the arms are received in a locking device which comprises a resilient member having a recess for receiving each arm. The resilient member may comprise a spring or be composed of an elastic material such as plastic or rubber. The pair of tines are pivoted downwardly while in the transport position.

37 Claims, 3 Drawing Sheets

ROTARY HAYRAKING IMPLEMENT FOR UNEVEN TERRAINS

RELATED APPLICATION

This is a continuation of International Application No. PCT/NL98/00577, filed Oct. 7, 1998, International Publication Date, Apr. 11, 1999.

FIELD OF THE INVENTION

The invention relates to an implement for displacing crop lying on the soil, said implement comprising at least one rake member which is driven so as to be rotatable about an upwardly orientated axis and which is provided with one or more outwardly extending arms that are vertically pivotable about one or more pivotal axes, which arms are provided with one or more outwardly extending tines that are also pivotable about one or more pivotal axes, while, in the transport position, one or more tines of one or more arms are pivoted downwardly.

BACKGROUND OF THE INVENTION

An implement of this type is described in the Dutch patent application 7607884.

This known machine is provided with arms carrying tines at their free ends. The arms consist of straight hollow box girders to which the tines are fitted, which tines are capable of pivoting upwardly about pivotal axes during operation.

This construction has proved to function less effectively than desired, especially when used on uneven soils.

For the purpose of bringing the prior art machine into transport position, the arms and the tines pivot upwardly and are locked by means of hooks.

The arms and tines of the known machine identified above can be brought into a transport position by an upward pivoting movement of the arms and a downward pivoting of the tines. The rake member has a conical housing which is constructed of plate material and to which the arms are fastened. This construction is, however, relatively heavy and the arms in their folded positions are unprotected.

SUMMARY OF THE INVENTION

The object of the invention of the instant invention is to provide an improvement of the machine described in the above Dutch Patent Application. In accordance with the invention an ensemble of one of more arms and one or more tines is arranged and constructed to have a center of gravity so that, when the implement is operative, the resultant of gravitational and the centrifugal force moves one or more arms with one or more tines towards the ground.

In accordance with the invention the tines react quickly to conform to unevenness in the soil. As a result, the tines' movement always remain near the ground, even though there are unevennesses in the underlying soil.

According to a further aspect of the invention, the rake member is provided with a frame with one or more arms that pivot into the transport position in upward direction about one or more pivotal axes. In this manner a lighter frame and better protection of the arms are provided.

According to a yet further aspect of the invention, the rake member is provided with a screen disposed around the rake member and located above the arms. This measure serves a threefold purpose: The tines are stored under the screen in the transport position so that separate locking means are not required; The screen furthermore serves as a guide member for crop when the machine functions to displace a considerable amount of crop; And finally the screen prevents the crop from reaching the rotor and thus interfering with the implement's operations. The lower side of the screen may be located at a height above the ground which is less than the height above the ground of the upper point of an upwardly pivoted arm. In this manner sufficient freedom of movement on the ground is obtained and the arm can pivot freely.

According to a still further invention feature, one or more pivotal axes of the arms are at a fixed distance from the axis of rotation and the pivotal axes are located so that they almost tangentially touch the circular path traced by the pivotal axes. In a preferred embodiment the arms trace a circular path and the pivotal axes are located on that circle.

In accordance with a further aspect of the invention, when the implement is operative, one or more tines enclose an angle of approximately fifteen degrees with the ground. In this connection, the arms may be provided with one or more groups of tines each of which is at an angle, of about fifteen degrees with the underlying ground. According to another invention feature, one or more tines of an arm have their center of gravity disposed so that, when the implement is operative, resultant forces of gravitation and the centrifugal motion move one or more tines towards the ground. In this manner, at a fixed rotational speed, positions of the tines relative to the ground always remain the same.

According to another inventive feature, in the working position, the center of gravity of a group of tines is higher above the ground than their pivotal axis. The center of gravity of the ensemble of the arm and one or more tines may also, however, be higher above the ground than the pivotal axis of the arm. Also in that situation the resultant of gravitational and centrifugal forces urge the arm and tines towards the ground.

According to again another invention feature, one or more tines of the arms pivot about one or more upwardly orientated axes that are connected to the arms. In this manner, the tines can also move in a plane extending substantially parallel to the ground. According to yet another aspect of the invention, one or more stops connected to one or more arms limit the pivoting movement of the arm about the pivotal axis.

In accordance with still another aspect of the invention, in the transport position, one or more arms rest in a locking device. This locking device may consist of a flexible element, such as a flexible plate provided with a recess in which the arm can be clamped. The flexible element may have a round shape. According to a further invention feature, the flexible element is composed of elastic material, such as plastic or rubber. Instead of a flexible element provided with a recess, the locking device may also consist of a plate having one or more recesses and a spring. According to a further inventive feature, for being secured one or more arms may be provided with one or more limiting cams.

According to again another aspect of the invention, seen in side view, one or more arms have at least substantially the shape of an inverted U. According to a further inventive feature, seen in side view, one or more arms are substantially straight.

In accordance with a yet further inventive feature, when the implement is operating, the points of tines, seen from above, trace circumferential paths that overlap each other.

BRIEF DESCRIPTION OF THE DRAWINGS

The invention will be explained in further detail with reference to exemplary embodiments.

DETAILED DESCRIPTION OF THE PREFERRED EMBODIMENTS

Figure 1:
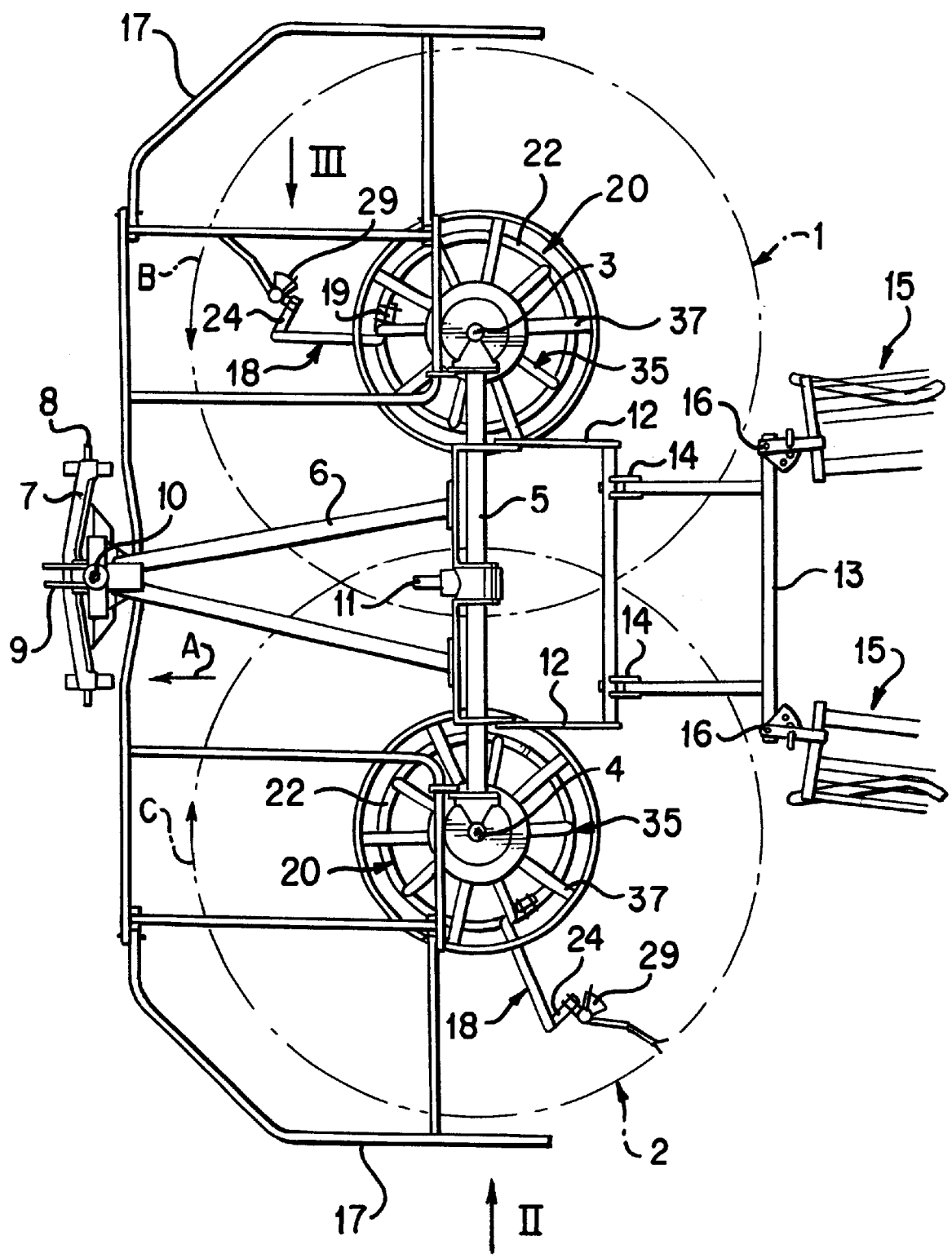
FIG. 1 is a plan view of a machine according to the invention.

The implement according to the inventive functions as a tedder and for raking swaths.

The machine comprises two rake members 1 and 2,, which are rotatable about upwardly orientated axes 3 and 4 respectively.

For that purpose the rake members are disposed on a frame beam 5 which is mounted on a frame portion 6 that extends forwardly in the direction of travel A during normal operations.

To frame portion 6 is fastened a trestle 7 by means of which the implement can be coupled in a well known manner known to the three-point lifting hitch of a tractor. Trestle 7 comprises lower coupling points 8 and an upper coupling point 9.

In a manner which is well known, frame portion 6 is pivotable relative to the trestle about an upwardly orientated axis 10. It is also possible to counterpoise or otherwise restrain the pivotability of frame portion 6 relative to trestle 7 upon lifting of the machine, which is advantageous when transporting the machine.

A power supply connection is disposed in frame beam for rotating the rake members, which power supply connection can be coupled to the power take-off shaft of a tractor by means of a coupling shaft 11 and a intermediate shaft, all of which is old and well known in the art.

During operations, rake members 1 and 2 are rotated in opposite directions, as indicated by arrows B and C, in such a manner that they are moving rearwardly in the middle of the machine. At the rear side of frame beam 5 is fastened a carrier frame 12 on which, by means of a frame beam 13, is connected to carrier frame 12 so as to be pivotable upwardly about horizontal axes, two swathers 15 are mounted. These swathers are connected to frame beam 13 so as to be pivotable about upwardly orientated axes 16 and can be adjusted and fixed in a number of positions.

The implement is provided with a protective bracket 17 which is disposed around the front side and the rear side of the machine.

In a particular embodiment rake members 1 and 2 are each provided with ten arms 18 which are connected to pivot about axes 19 relative to a frame 20 of the rake member. Axes 19 are disposed relative to axes of rotation 3 and 4 at approximately an angle of ninety degrees, and axes 19 each constitute a tangent relative to an imaginary circle that can be drawn around each of axes 3 and 4.

Figure 3:
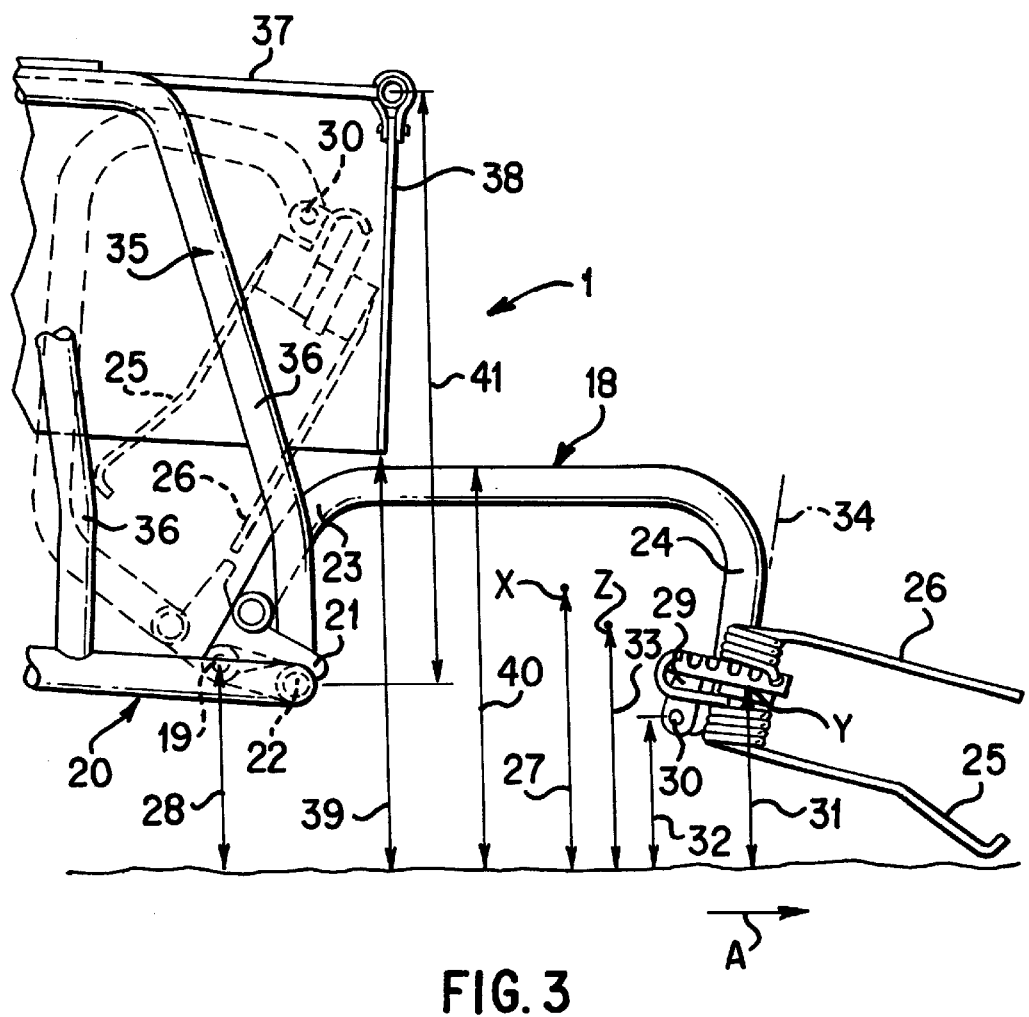
FIG. 3 is, in an enlarged scale, a side elevational view as seen in the direction of arrow III in FIG. 1.

As shown in FIG. 3, arms 18 comprise a stop 21 which can contact a hoop-shaped frame beam 22 of frame 20 of the rake member. The downward movement of each arm 18 is thus limited. In side view, as shown in FIG. 3, arms 18 have the shape of an inverted U.

By means of a leg 23 an arm 18 is connected to the frame of the rake member via a pivotal axis 19. In this exemplary embodiment, there are fastened two rake tines 25 and 26 to the other leg 24 of arm 18. However, it is also possible for one or three tines to be mounted in each arm 18.

In FIG. 3 arm 18 and rake tines 25 and 26 are represented in their working positions in which they extend outwardly. In this position the center of gravity X of arm 18 is preferably a greater distance 27 above the ground than the distance 28 of pivotal axis 19 above the ground.

Rake tines 25 and 26 are disposed on a carrier 29 which is connected to leg 24 of arm 18 so as to be rotatable about a pivotal axis 30.

Pivotal axis 30 crosses the axes of rotation 3 or 4 of the corresponding rake member. It is orientated during operation to be at least substantially horizontal and is located approximately tangentially relative to a circle extending around the axis 3 or 4 respectively, the axis preferably being at an angle from ten degrees to twenty degrees with the tangent. In a preferred embodiment tines 25 and 26 are disposed at an angle of fifteen degrees with the ground.

The tine arrangement which comprises rake tines 25 and 26 and carrier 29 has a center of gravity Y which is at such a distance 31 above the ground so that, under normal operations conditions, upon rotation of the rake member, the tines pivot downwardly relative to pivotal axis 30 due to their reaction to centrifugal force. Preferably the distance 31 above the ground is greater than the distance 32 of the pivotal axis above the ground to cause this effect.

The center of gravity Z of the ensemble of arm 18, tines 25 and 26 and carrier 29 is at such a distance 33 above the ground that, under normal operational conditions, upon rotation of the rake member, arm 18 together with tines 25 and 26 are caused to pivot downwardly by the resultant of gravitational and centrifugal force. Preferably distance 33 above the ground is greater than distance 28 between pivotal axis 19 and the ground.

The tines are connected to carrier 29 so as to be adjustable about an upwardly orientated axis 34, s0 that the tines can be adjusted into different positions such as for creating a swath, in which the tines are in their greatest trailing position (FIG. 1, rake member 2), or a position for the tedder, in which they are in a less trailing position (FIG. 1, rake member 1).

Seen from above, arm 18 has a shape in which, viewed in the directions of rotation B and C legs 23 and 24 are tilted somewhat rearwardly.

Frame 20 of the rake member consists of a carrier frame 35 to which five downwardly extending frame beams are fastened.

The lower sides of frame beams 36 are fastened to circular frame beam 22, s0 that there is created a carrier frame for arms 18 and rake tines 25 and 26. In this embodiment a total of ten arms are disposed at equal mutual distances from frame beam 22.

By means of a number of arms 37, a screen 38 made of flexible material, such as a fabric coated with synthetic material, is fitted to carrier frame 35 and disposed around the rake member, which screen 38 serves as a guide member for the crop that is displaced by the tines. The lower side of screen 38 is located at a height 39 above the ground, which height 39 is less than the distance from the upper point of an upwardly pivoted arm 18 to the ground. However, the distance 39 of the lower side of this screen above the ground is greater than the distance 40 of the upper surfaces of arms 18 about the ground in the region of the screen. Height 41 from the upper side of the screen to the frame beam 22 is greater than the distance from a pivotal axis 19 to the outermost lateral side of leg 24. The distance 39 is greater than thirty centimeters and is preferably approximately forty centimeters.

Arms 18 and tines 25 and 26 can be moved into a transport position are shown in FIG. 3.

The construction of the screen enables arms 18 to pivot together with rake tines 25 and 26, that are pivotable about the pivotal axes 30, in such a manner that they can be brought into a transport position along the lower side of the screen.

For this purpose, rake tines 25 and 26 are rotated counter-clockwise until they are positioned beside arms 18 and then the arms and the rake tines are moved together into a transport position along the lower side of screen 38 that can be folded upwardly. In their folded position arms 18 are located between frame beams 36 of the rake member. So disposed, the arms and tines can no longer simply pivot outwardly. This is only possible when screen is raised.

Because of the positions of centers of gravity Y and Z, arms 18 with tines 25 and 26 are urged against the ground during operation by the resultant of the gravitational and the centrifugal force exerted thereon. In this situation it is important that not only the tines, but also the combination of arms and tines, be subjected to this resultant, so that the effect of the tines is also favorable in case of an uneven soil, even in case of considerably unevennesses. As shown in FIG. 1, the circles traced by the tine points overlap each other. To that end the tines of the rake members are arranged in a somewhat staggered position. In this embodiment each arm is provided with two tines. Of course, they may be provided with only one tine or more than two tines as alternatives.

As usual, the rake members are supported by running wheels 42 disposed thereunder.

Figure 2:
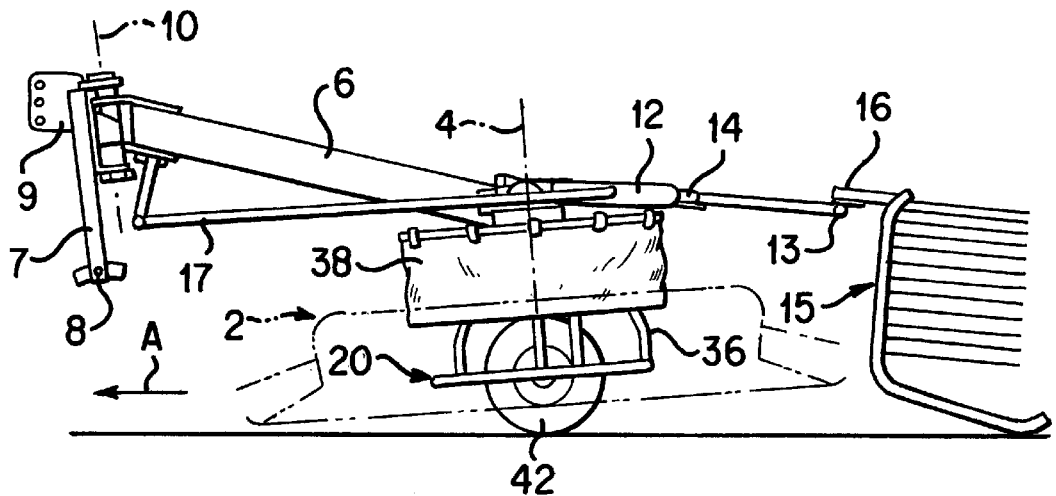
FIG. 2 is a side elevational view as seen in the direction of arrow II in FIG. 1.
Figure 5:
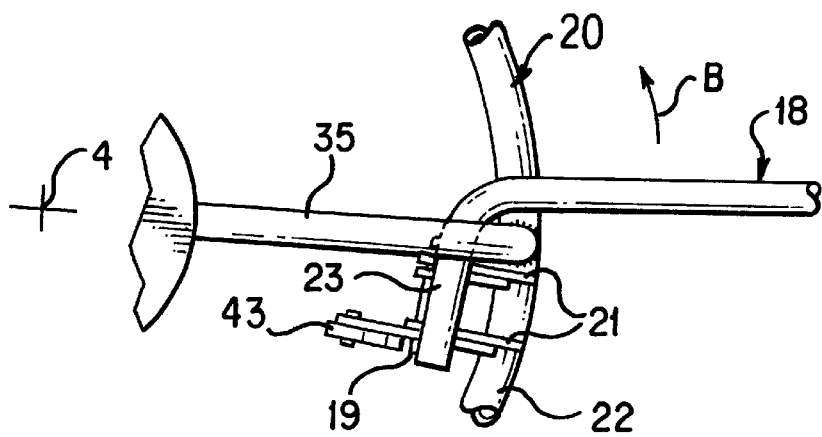
FIG. 5 is, in an enlarged scale, a fragmentary detail of FIG. 4 shown in plan.
Figure 4:
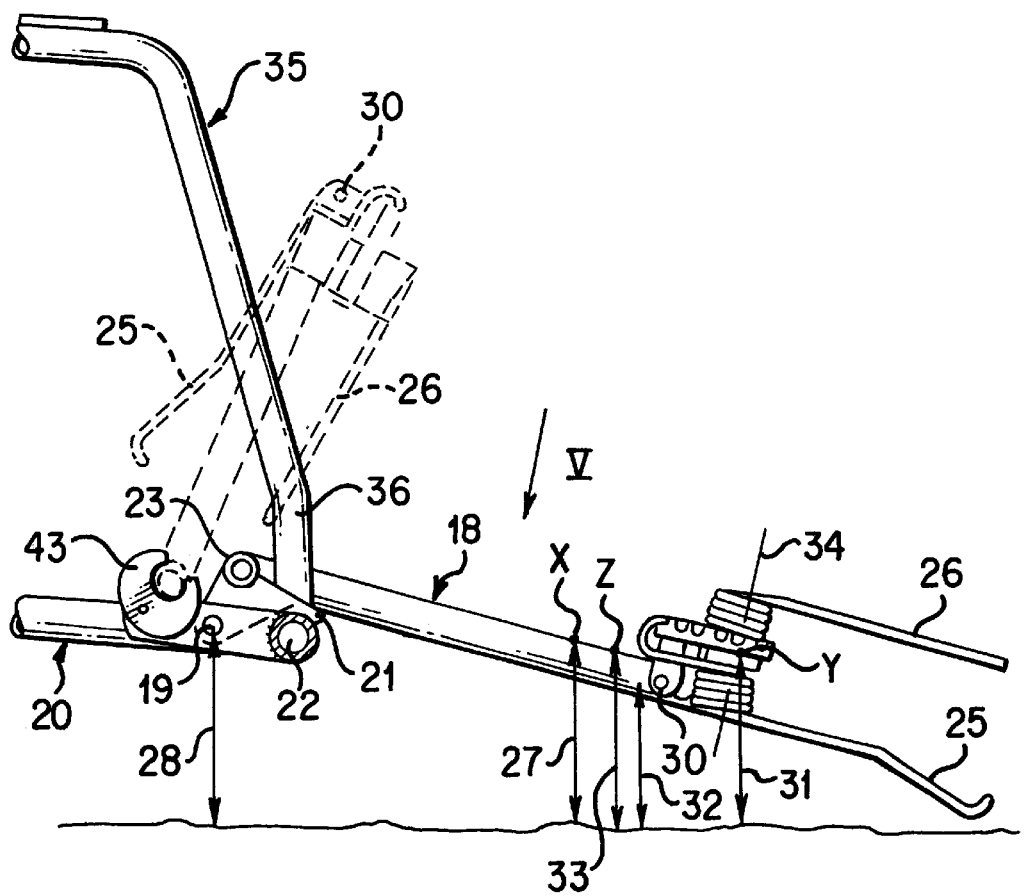
FIG. 4 is, in an enlarged scale, a side elevational view as seen in the direction of arrow III in FIG. 1, showing an alternative embodiment of the rake member.

FIG. 4 shows an alternative embodiment of arm 18. FIG. 5 provides a detail of FIG. 4 at an enlarged scale. The direction of rotation is indicated as B and corresponds to the direction of rotation of rake member 1 in FIG. 1. In this situation the arm is straight in side view. Like in the situation of the U-shaped arm, leg 23 extends somewhat rearwardly as shown in FIG. 5. Because of the positions of pivotal axes 19 and 30 and the centers of gravity X of the arm and Y of the tines and the combined center of gravity Z of the arm and the tines, there is still a resultant of the gravitational and the centrifugal force by which arm 18 and tines 25 and 26 move towards the ground. In a preferred embodiment the tines enclose an angle of fifteen degrees with the ground. The movements of the arms towards the 38 ground is limited by stops 21. A screen 38 is not provided. Instead, in the transport position, arms 18 are received by a locking device 43 in which they are locked by clamping. In this situation the tines pivot downwardly in the same equal manner as in the embodiment of FIGS. 1–3. In this embodiment the locking device is constituted by a flexible round shaped plate provided with a recess in which the round tuba of arm 18 is clamped. In a preferred embodiment this locking plate is made of synthetic material or rubber. As an alternative the locking device may be constituted by a plate provided with a recess and a spring, in which case the recess ins the plate pulled by the spring over a limiting cam provided on arm 18.

Although we have disclosed the preferred embodiments of our invention, it is capable of other adaptations and modifications within the scope of the following claims:

Having disclosed our invention, what we claim as new and to be secured by Letters Patent of the United States of America is:

1. An implement for displacing crop lying on the ground, said implement comprising a rake member which rotates about an upwardly orientated axis and which is provided with an outwardly extending arm that is pivotable in upward direction about a pivotal axis, which arm is provided with an outwardly extending tine arrangement that is pivotable about a further pivotal axis and when in a transport position said tine arrangement is pivoted downwardly said further pivotal axis being lower than the center of gravity of said tine arrangement when in an operative position, said arm and said tine arrangement when the implement is operating and said rake member is rotating being urged outwardly towards the ground by the resultant force exerted thereon by gravity and centrifugal force.

2. An implement in accordance with claim 1, wherein said rake member is provided with a frame to which said arm is connected, said arm when in the transport position being pivoted in an upward direction about said first mentioned pivotal axis.

3. An implement in accordance with claim 1, wherein said first mentioned pivotal axis is located at a fixed distance from said upwardly orientated axis and is substantially disposed in the direction of a tangent to a circle which is traced by the rotation of said first mentioned pivotal axis when the implement is operating.

4. An implement in accordance with claim 1, wherein, said further pivotal axis of said outwardly extending tine is located at a substantially fixed distance from said upwardly orientated axis and is substantially located in the direction of a tangent that substantially touches the circumferential path traced by said further pivotal axis.

5. An implement in accordance with claim 1, wherein when the implement is operating, said tine intersects the underlying ground at an angle of approximately 1520.

6. An implement in accordance with claim 1, wherein the center of gravity of said arm is disposed higher relative to the underlying ground than said first mentioned pivotal axis when the implement is being operated.

7. An implement in accordance with claim 1, wherein said arm is provided with at least one further outwardly extending tine.

8. An implement in accordance with claim 1, comprising a further upwardly orientated axis and a carrier for supporting said tine, said tine being connected to said carrier so as to be adjustable about said further upwardly orientated axis to different positions including a position for creating a swath of said material lying on the ground.

9. An implement in accordance with claim 1, comprising a stop for limiting pivoting movement of said arm about said first mentioned pivotal axis.

10. An implement in accordance with claim 2, comprising a locking device mounted on said frame, said locking device retaining said arm in an upward disposition when in a transport position.

11. An implement in accordance with claim 10, wherein said locking device comprises a flexible element that has a recess in which said arm is received and held when in a transport position.

12. An implement in accordance with claim 11, wherein said flexible element as seen in the direction of said first mentioned axis is generally circular in configuration.

13. An implement in accordance with claim 11, wherein said flexible element is composed of an elastic material.

14. An implement in accordance with claim 13, wherein said elastic material comprises a plastic material.

15. An implement in accordance with claim 13, wherein said elastic material comprises rubber.

16. An implement in accordance with claim 10, wherein said locking device comprises a plate having a recess and a resilient member.

17. An implement in accordance with claim 10, wherein said arm is provided with a limiting cam.

18. An implement in accordance with claim 1, wherein said arm is tubular.

19. An implement in accordance with claim 1, wherein said arm, as seen in a side elevation, is substantially in the shape of an inverted "U".

20. An implement in accordance with claim 1, wherein said arm, as seen in side elevation, is substantially straight.

21. An implement in accordance with claim 1, which comprises a further rake member which is similar to said first mentioned rake member and is connected in a framework together with said first mentioned rake member so as to be adjacent to said first mentioned rake member, said further rake member comprising a further arm similar to said first mentioned arm which is provided with an outwardly extending further tine similar to said first mentioned tine, said first mentioned tine and said further tine having outer points which trace circumferential paths that overlap each other when the implement is operating.

22. An implement for displacing crop lying on the ground, said implement comprising a rake member which rotates around an upwardly orientated axis and which is provided with an outwardly extending arm that is pivotable in an upward direction about a pivotal axis, which arm is provided with an outwardly extending tine that is pivotable about a further pivotal axis and when in the transport position said tine is pivoted downwardly, said arm and said tine when the implement is operating and said rake member is rotating being urged towards the ground by the resultant force exerted thereon by gravity and centrifugal force, the implement further comprising a screen composed of flexible material which is disposed around said rake member and is located above said arm.

23. An implement in accordance with claim 22 wherein said screen has a lower edge, said lower edge being spaced above the underlying ground by a distance which is smaller than the uppermost distance of said arm above the ground when said arm is pivoted in an upward direction about said further mentioned pivotal axis.

24. An implement for displacing crop lying on the ground, said implement comprising a rake member which rotates around an upwardly orientated axis and which is provided with an outwardly extending arm that is pivotable in an upward direction about a pivotal axis, which arm is provided with an outwardly extending tine that is pivotable about a further pivotal axis and when in the transport position said tine is pivoted downwardly, said arm and said tine when implement is operating and said rake member is rotating being urged towards the ground by the resultant force exerted thereon by gravity and centrifugal force, said arm further being provided with at least one further outwardly extending tine, said tine and said further tine being connected together and having a center of gravity which is disposed higher relative to the underlying ground than said further pivotal axis when the implement is operating.

25. An implement in accordance with claim 24, wherein the center of gravity of said arm is higher above the underlying ground than said first mentioned pivotal axis when the implement is operating.

26. An implement for displacing crop lying on the ground, said implement comprising a rake member which rotates about an upwardly orientated axis and which is provided with an outwardly extending arm that is pivotable in vertical directions, said arm being provided with an outwardly extending tine, said rake member being provided with a frame to which said arm is pivotably connected, said arm when in a transport position being pivoted in an upward direction, a locking device mounted on said frame, said locking device being composed of a resilient material and having a recess therein, said arm supportably received by said locking device when pivoted upwardly into a transport position.

27. An implement in accordance with claim 26, wherein said locking device is composed of plastic.

28. An implement in accordance with claim 26, wherein said locking device is composed of rubber.

29. An implement for displacing crop lying on the ground, said implement comprising a rake member which rotates about an upwardly orientated axis which is provided with an outwardly extending arm that is pivotable in vertical directions, said arm being Provided with an outwardly extending tine, said rake member being provided with a frame to which said arm is pivotably connected, said arm when in a transport position being pivoted in an upward direction, a locking device mounted on said frame, said locking device comprising a spring and having a recess therein, said arm supportably receive by said locking device when pivoted upwardly into a transport position.

30. An implement for displacing crop lying on the ground which comprises a framework and a plurality of rake members mounted thereon, each said rake member rotating about an upwardly orientated axis and being provided with a plurality of outwardly extending arms, each said arm being pivotable in vertical directions about a corresponding pivotal axis, each of said arms being provided with a pair of outwardly extending tines, each said pair of tines being pivotable about a further pivotal axis wherein while in a transport position, each said pair of tines is pivoted downwardly, said further pivotal axis being lower than the center of gravity of said pair of tines when in an operative position and when the implement is operating and said rake members are rotating said arms together with said pairs of tines, said pairs of tines are urged toward the ground by the resultant force exerted thereon by gravity and centrifugal force, two of said rake members being adjacent and rotating in opposite directions, said tines having outermost points, the circumferential paths of said outmost points of said tines of said adjacent rake wheels overlapping each other.

31. An implement in accordance with claim 30, wherein each said rake member is provided with a frame to which said arms on the corresponding rake wheels are pivotably connected to move in an upward direction for being placed in a transport position.

32. An implement in accordance with claim 31, which comprises a plurality of locking devices mounted on said frame to receive a corresponding said arm, said locking device comprising a resilient element.

33. An implement in accordance with claim 32, wherein said resilient element is composed of an elastic material.

34. An implement in accordance with claim 33, wherein said elastic material is a plastic.

35. An implement in accordance with claim 33, wherein said elastic material is rubber.

36. An implement in accordance with claim 30, wherein each of said arms is provided with a limiting cam.

37. An implement for displacing crop lying on the ground which comprises a framework and a plurality of rake members mounted thereon, each said rake member rotating about an upwardly orientated axis and being provided with a plurality of outwardly extending arms, each said arm being Pivotal in vertical directions about a corresponding pivotal axis, each of said arms being provided with a pair of outwardly extending tines, each said pair of tines being pivotable about a further pivotal axis wherein while in a transport position each said pair of tines is pivoted downwardly, and when the implement is operating and when said rake members are rotating said arms together with said pairs of tines, said pairs of tines are urged towards the ground by the resultant force exerted thereon by gravity and centrifugal force, two of said rake members being adjacent and rotating in opposite directions, said tines having outermost points, the circumferential paths of said outermost points of said tines of said adjacent rake wheels overlapping each other, each said rake wheel being provided with a frame to which said arms on the corresponding rake wheels are pivotably connected to move in an upwardly direction for being placed in a transport position, a plurality of locking devices mounted on said frame to receive a corresponding said arm, each said locking device comprising a spring.

* * * * *